United States Patent [19]
Gross

[11] 3,925,990
[45] Dec. 16, 1975

[54] SHOCK HEATED, WALL CONFINED FUSION POWER SYSTEM

[75] Inventor: Robert A. Gross, New Rochelle, N.Y.

[73] Assignee: The United States of America as represented by the Secretary of the Air Force, Washington, D.C.

[22] Filed: Aug. 28, 1973

[21] Appl. No.: 392,377

[52] U.S. Cl. .......................... 60/644; 176/3; 176/9
[51] Int. Cl.² .......................................... G21D 5/12
[58] Field of Search ................. 176/1, 3, 9; 60/644

[56] References Cited
UNITED STATES PATENTS
3,762,992  10/1973  Hedstrom .............................. 176/1

Primary Examiner—Martin P. Schwadron
Assistant Examiner—Allen M. Ostrager
Attorney, Agent, or Firm—Joseph E. Rusz; Henry S. Miller, Jr.

[57] ABSTRACT

A fusion-engine-reactor system having a shock heated plasma confined between two coaxial cylinders connected at one end by a concave shaped wall, a magnetic piston compresses the plasma and initiates the plasma fusion reaction, while a supplementary "stuffing" magnet confines the reaction to the end of the cavity, a lithium blanket and heat exchanger provide a means for converting the generated heat into usable energy to operate an attached turbine-generator assembly.

4 Claims, 2 Drawing Figures

SHOCK HEATED, WALL CONFINED FUSION POWER SYSTEM

BACKGROUND OF THE INVENTION

This invention relates generally to a system for obtaining useful power from controlled thermonuclear fusion and more specifically to a system which produces electrical power from the consumption of deuterium and tritium gas.

It has long been the ideal of those skilled in the art to be able to harness the energy of thermonuclear fusion and provide a system which would allow this energy to be converted into some useful form in order that it might perform work.

In the past, many various concepts, methods and devices have been studied in order to provide a practical, workable system for the production of energy. The concept believed to be most studied by those attempting to achieve a successful controlled thermonuclear reactor has been that of heating hydrogen isotopes to fusion temperature and isolating and confining the hot plasma by magnetic fields. The reactor wall is considered to be separated from the hot plasma by a vacuum magnetic field region. A multitude of ingenious magnetic field configurations have been studied in detail, however, all have fallen short of the goal for reasons known to those in the art.

Another system under study relied upon the development of very high power lasers or electron beams and the inertia of matter. This system does not attempt to confine the fusion reaction and is conceded to provide a "mini-bomb" approach. Draw-backs to this type of system are also apparent to those skilled in the art.

An alternative to the aforementioned approach and the subject of this invention is a system whereby a plasma is shock heated and confined by a combination of magnetic fields and solid walls. From the employment of a combination of magnetic fields and solid walls for confinement of the reaction, a relatively small size, high energy density, high Beta, pulsed thermonuclear power system is possible.

Previously wall confinement of a plasma has been considered as impractical due to the heat and energy involved in the fusion process. A further drawback has been the inability to sustain the process sufficiently to allow for reasonable heat transfer. It has been found that with an imbedded transverse magnetic field in the plasma, the energy transfer to the wall may be kept sufficiently small so that a hot plasma core will have sufficient time to react.

This invention solves the problems of the prior art and allows a power system to be operated as a result of thermonuclear fusion.

SUMMARY OF THE INVENTION

The invention in concept is not unlike the cycle of the diesel engine. A magnetic field piston, formed by a large current in a cylindrical geometry, drives a strong shock wave along a coaxial cavity. The shock creates a hot dense plasma which flows behind the wave front at nearly three-fourths of the speed of the shock. At the end of the cylinder, the shock reflects from the end wall and propagates through the plasma, heating and compressing it further, and bringing the plasma to rest relative to the cylinder.

The magnetic piston sweeps up all gas, heats it and compresses it into the end of the coaxial cylinder. The reflecting end of the cylinder is curved in such a manner as to generate a cylindrical imploding shock wave which will further heat and compress the gas. An additional strong magnetic field is then applied confining the plasma to the end of the tube. Thermonuclear energy is released when the plasma state is at sufficiently high temperature and density.

The plasma is cooled by the wall, the additional magnetic field is maintained and the interior hot plasma core, insulated by surrounding cooler plasma, will have sufficient lifetime to produce more thermonuclear energy than was required by the magnetic piston, the secondary field and other energy inputs. The majority of the fusion energy is transferred through the walls where it is absorbed in a cooling blanket. The hot blanket fluid is used to run a thermal-turbine cycle which produces electricity for powering the next cycle of the cylinder.

It is therefore an object of the invention to provide a new and improved fusion power system.

It is another object of the invention to provide a new and improved system for obtaining useful power from controlled thermonuclear fusion.

It is a further object of the invention to provide a new and improved means to heat, confine and extract energy from fusion reactions.

It is still another object of the invention to provide a new and improved pulsed thermonuclear fusion engine reactor.

It is still a further object of the invention to a new and improved fusion power system that is adaptable to converting nuclear energy directly into electrical energy.

These and other advantages, features and objects of the invention will become more apparent from the following description taken in connection with the illustrative embodiments in the accompanying drawings.

DESCRIPTION OF THE PREFERRED EMBODIMENT

Figure 1:
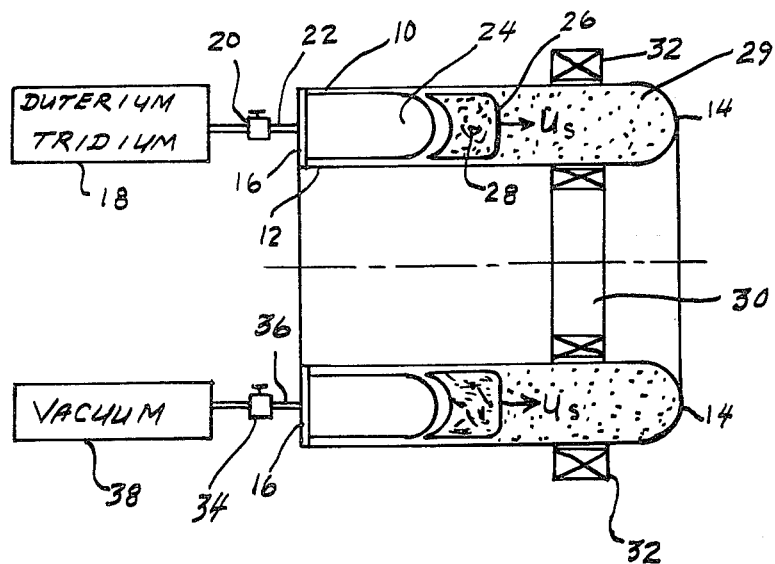
FIG. 1 is a cross-sectional view of the coaxial cylinder utilized in the invention.

Referring now to FIG. 1, two coaxial cylinders are shown at 10 and 12. The cylinders are connected at one end by a shaped wall 14 and at the other by an adapter plate 16. The volume between the coaxial cylinders contains the fusion reaction.

The volume is filled with a mixture of duterium and tritium from the supply 18 past valve 20 through the pipe 22. A magnetic field piston 24, formed by a large current in a cylindrical geometry, drives a strong shock wave 26 along the coaxial cavity. The shock wave creates a hot dense plasma 28 from the gas 29 which flows behind the wave front (26) at about three-fourths of the speed of the shock. At the end of the cavity, the shock reflects from the shaped end wall 14 and propagates back through the plasma.

When the reflected shock wave intersects the magnetic piston, an expansion wave will begin to propagate into the plasma causing it to stream forth from the end of the cylinder with a subsequent reduction in both density and temperature. To prevent this from occurring, axial confinement is utilized in the form of the magnets 30 and 32. The magnets will contain the plasma in the area adjacent the wall 14.

Confined to the end of the cylinder, the hot plasma in contact with the side and end walls, begins to cool. The outer walls of the cylinder are in heat transfer contact with a cooling blanket which will allow the heat generated to be converted into usable electrical energy.

After the maximum heat has been extracted from the fusion reaction, the magnetic force fields are relaxed and the cavity is evacuated. The valve 34 is opened and the remaining gas is removed via pipe 36 to the vacuum chamber 38. Upon completion of the evacuation, the cycle is repeated.

Figure 2:
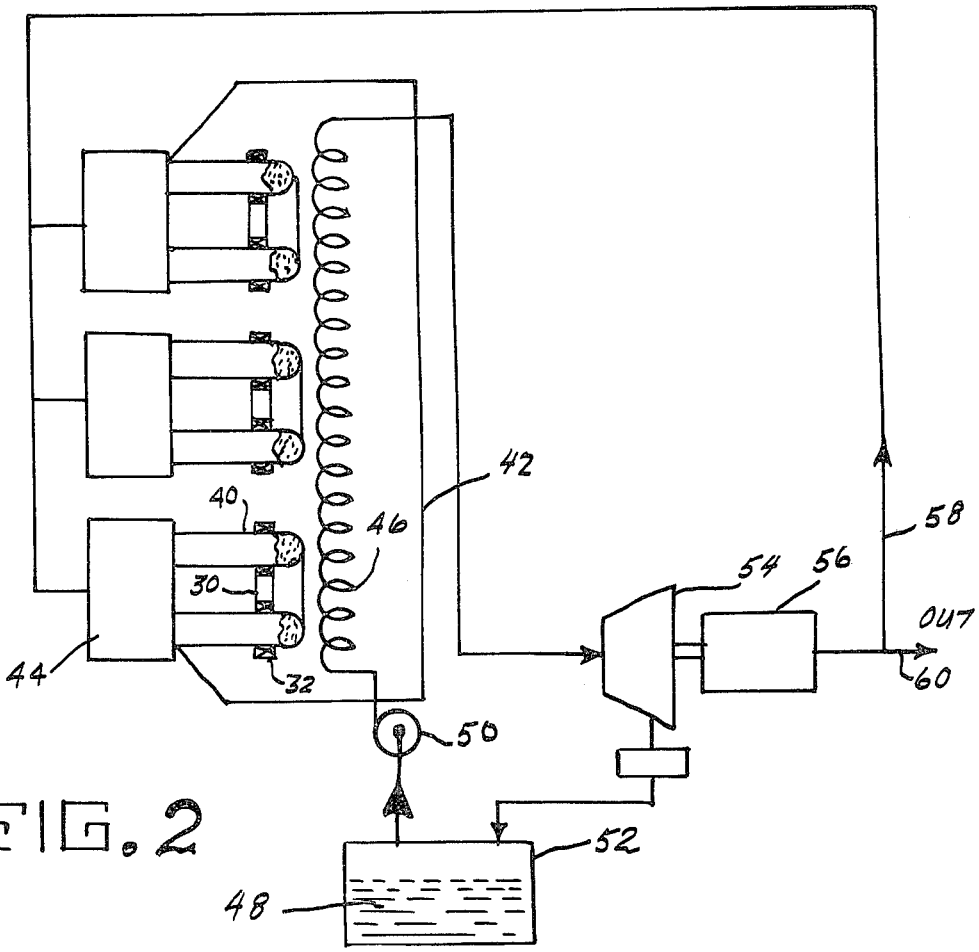
FIG. 2 is a diagrammetric representation of the system of the invention.

FIG. 2 shows a complete fusion power system. A plurality of fusion reactor cylinders 40 are assembled with the shaped plasma fusion wall 14 extending into a chamber 42 containing lithium or other appropriate heat transfer medium. The gas control system and magnetic piston electronics are shown as contained in the exteriorly mounted container 44.

As the fusion reaction takes place, heat from the reaction plus liberated netrons and heat from the magnet coils transfers into the lithium blanket which in turn transfers heat to the heat transfers heat to the heat transfer coil 46. A coolant 48 is pumped (50) from the reservoir 52 through the coil 46 where it is converted into steam where it feeds the turbine 54 before condensing and returning to the reservoir 52. The turbine will turn a conventional generator 56 and provide power for the fusion reactor system via line 58 with the surplus power provided via line 60 for outside power needs.

By combining a plurality of fusion cylinders, a fusion engine-reactor system is capable of providing substantial electrical power in the thousands of megawatt range for industrial and domestic uses.

It should be understood, of course, that the foregoing disclosure relates to only a preferred embodiment of the invention and that numberous modifications or alterations may be made therein without departing from the spirit and scope of the invention as set forth in the appended claims.

I claim:

1. A fusion reactor power system comprising: means for controlling and containing a thermonuclear fusion reaction including, a pair of coaxial cylinders, each of said cylinders being closed at one end with a concave shaped reflecting wall and forming a cavity; means for absorbing heat energy from said containing means; heat exchange means located in the heat absorbing means; fluid means; a pump means for pumping said fluid through the heat exchange means; a turbine generator means connected to the heat exchange means whereby the fluid pumped through the heat exchanger will expand and cause the turbine to operate and generate electrical current.

2. A fusion reactor power system according to claim 1 wherein; said means for controlling and containing a thermonuclear fusion reaction includes means for injecting and means for removing a gas from the cavity.

3. A fusion reactor power system according to claim 2 wherein; said means for controlling and containing a thermonuclear fusion reaction includes a magnetic piston means for generating a shock wave in the cavity.

4. A fusion reactor power system according to claim 3 wherein; said means for controlling and containing a thermonuclear fusion reaction includes a magnetic means for containing the fusion reaction.

* * * * *